Feb. 5, 1952     R. E. ROBERTS     2,584,501
METHOD OF MAKING FLEXIBLE CORRUGATED TUBES
Filed March 9, 1945     5 Sheets-Sheet 1

INVENTOR.
ROBERT ELDON ROBERTS
BY
Bates, Teare, y McBean
ATTORNEYS

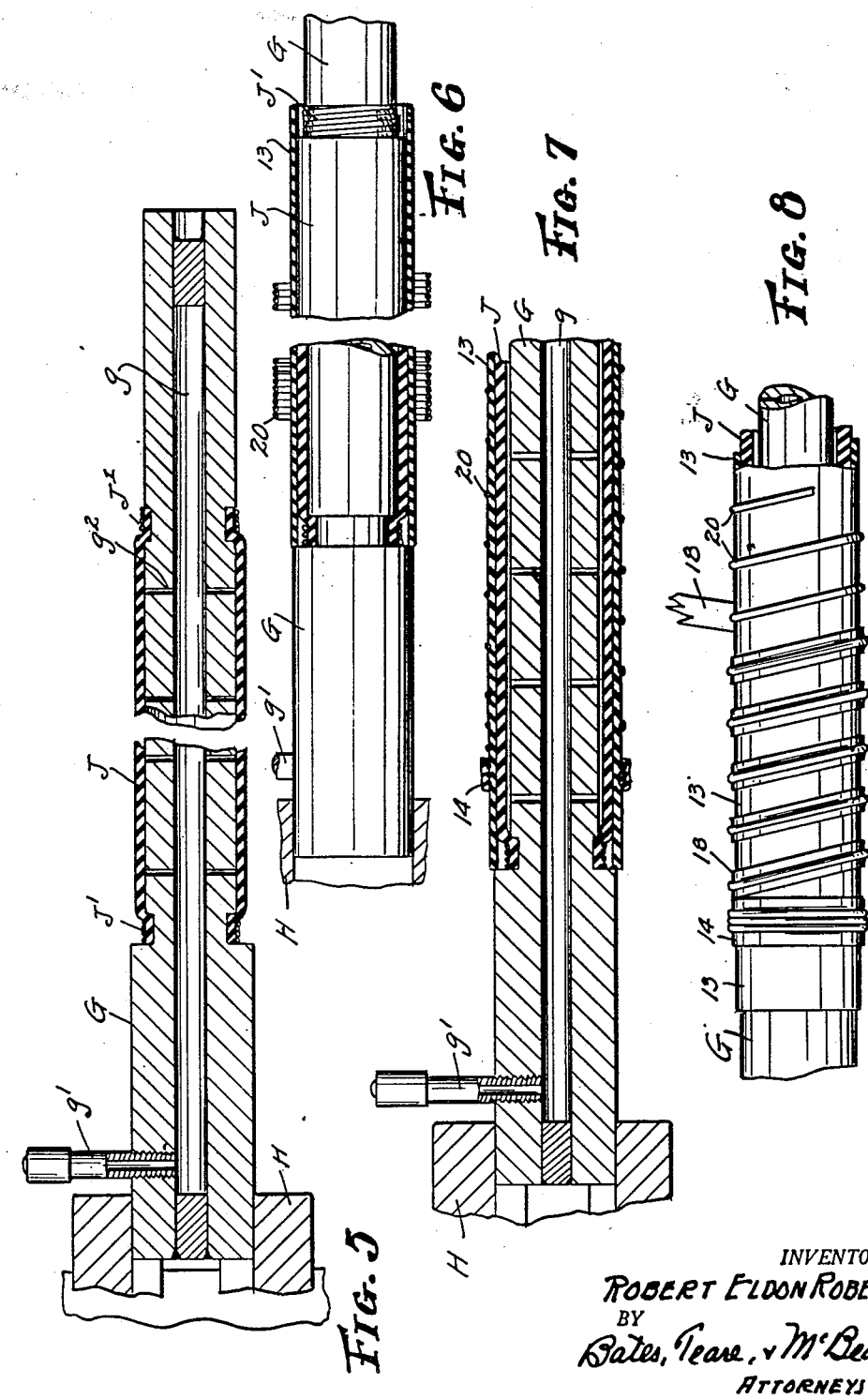

Feb. 5, 1952  R. E. ROBERTS  2,584,501
METHOD OF MAKING FLEXIBLE CORRUGATED TUBES
Filed March 9, 1945  5 Sheets-Sheet 3

INVENTOR.
ROBERT ELDON ROBERTS
BY
Bates, Teare, & McBean
ATTORNEYS

Feb. 5, 1952   R. E. ROBERTS   2,584,501
METHOD OF MAKING FLEXIBLE CORRUGATED TUBES
Filed March 9, 1945   5 Sheets-Sheet 4

INVENTOR.
ROBERT ELDON ROBERTS
BY
Bates, Teare, & McBean
ATTORNEYS

Feb. 5, 1952            R. E. ROBERTS            2,584,501
METHOD OF MAKING FLEXIBLE CORRUGATED TUBES
Filed March 9, 1945            5 Sheets-Sheet 5

INVENTOR.
ROBERT ELDEN ROBERTS
BY
Bates, Teare, & M<sup>c</sup>Bean
ATTORNEYS

Patented Feb. 5, 1952

2,584,501

UNITED STATES PATENT OFFICE 2,584,501

METHOD OF MAKING FLEXIBLE CORRUGATED TUBES

Robert Eldon Roberts, Ridgefield, Conn.

Application March 9, 1945, Serial No. 581,842

4 Claims. (Cl. 154—8)

This invention relates to a flexible impervious tube for various uses, where it is important that the tube be readily flexed without danger of it being collapsed to shut off its passage. My tube is flexible and resilient and may be stretched or compressed axially or bent in any direction. It is well adapted for use with gas masks, oxygen helmets, anaesthetizing apparatus, for instance, or with various equipment where a flexible noncollapsible conduit is desired.

An object of the invention is to provide such a tube which while being comparatively light in weight and very flexible shall be thoroughly impervious on both the interior and exterior.

Another object is to provide such a tube which while corrugated shall have a smooth exterior surface not liable to mildewing or other marring effects in use.

My tube is adapted for economical manufacture, and the present invention provides a novel method for so making the tube. This method may be carried out with several variations, all having common characteristics, as explained in the following description, with reference to the accompanying drawings.

Figure 1:
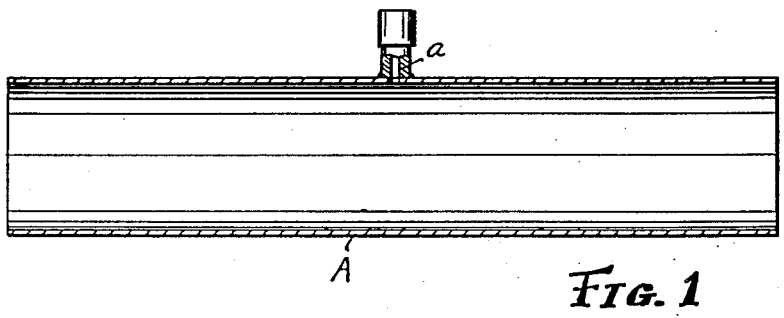
Figure 2:
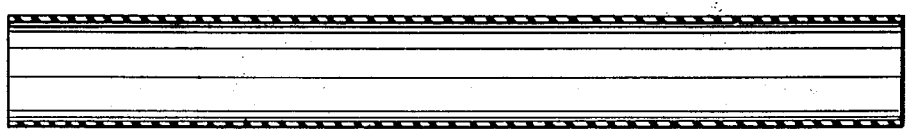
Figure 3:
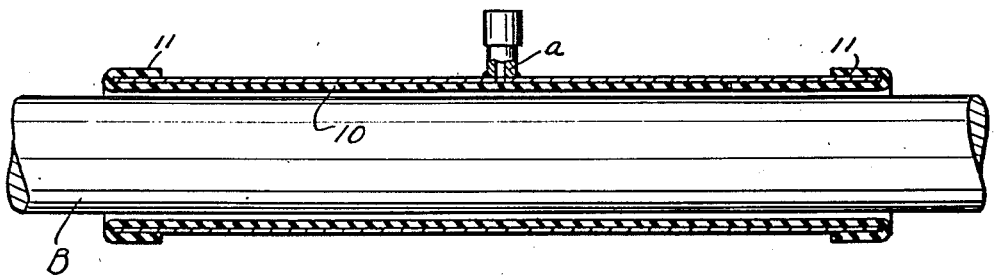
Figure 4:
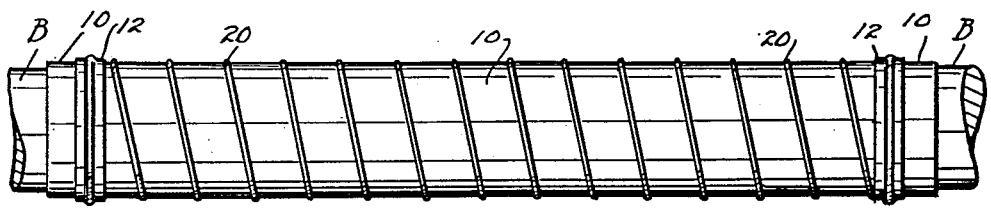
Figure 9:
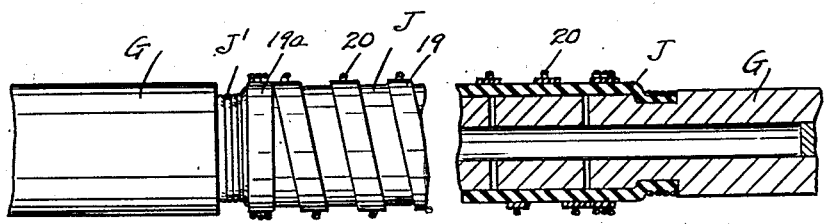
Figure 10:
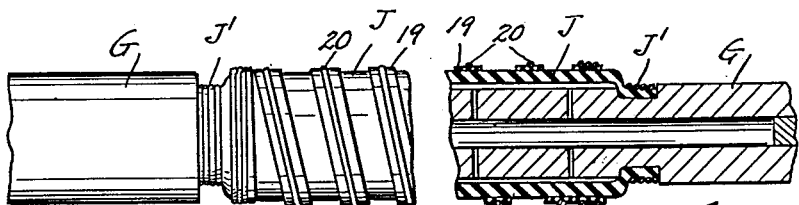
Figure 11:
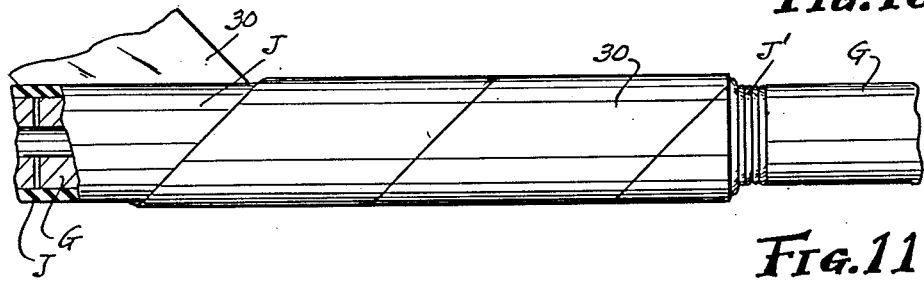
Figure 12:
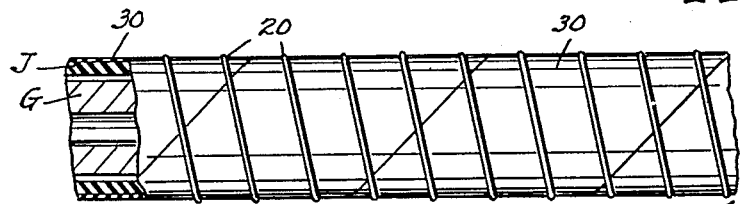
Figure 13:
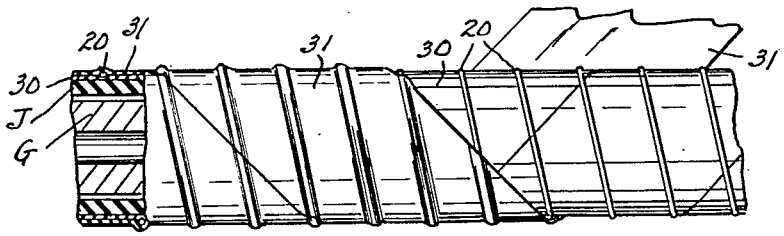
Figure 14:
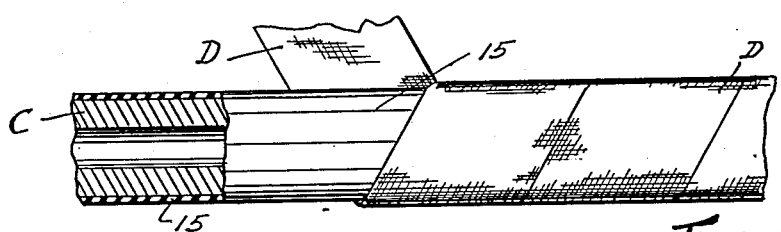
Figure 15:
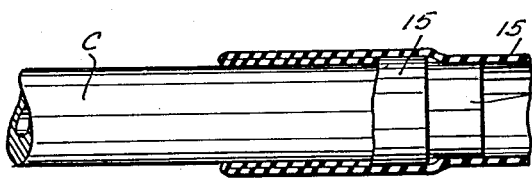
Figure 16:
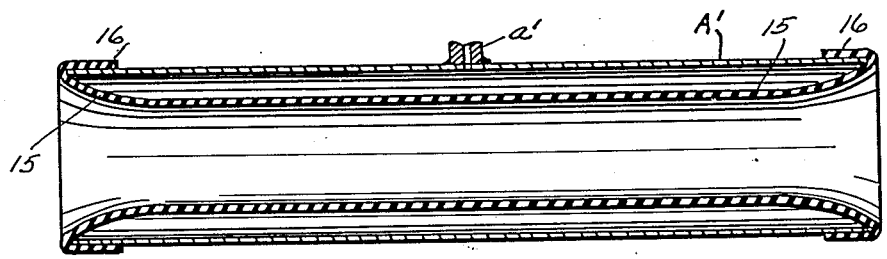
Figure 17:
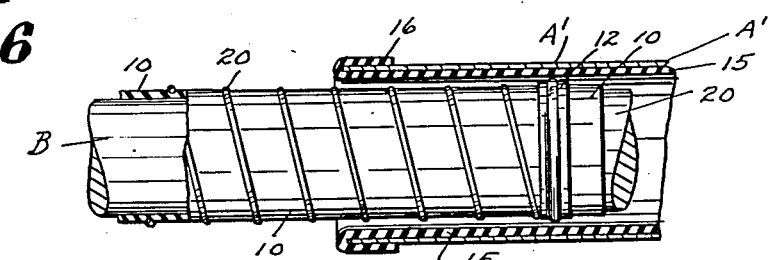
Figure 18:
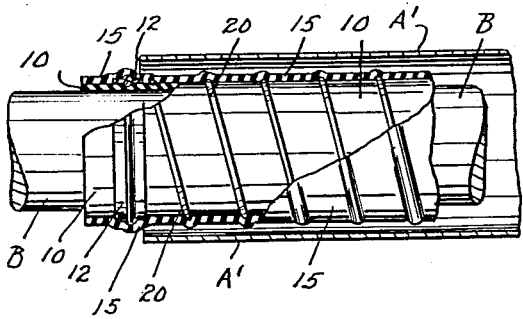
Figure 19:
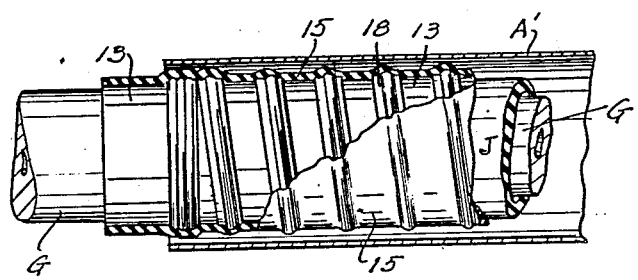
Figure 20:
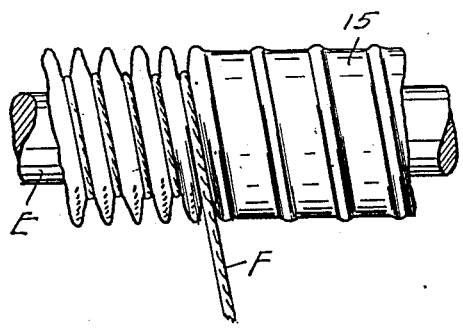
Figure 21:

In the drawings, Fig. 1 is an axial section through a forming device which may be used in performing this invention; Fig. 2 is an axial section of an elastic tube of rubber or similar material which may constitute the foundation or the covering of the composite tube produced by this invention; Fig. 3 is an axial section illustrating the use of the forming device of Fig. 1 to seat the tube of Fig. 2 on a rigid mandrel; Fig. 4 is an elevation showing the mandrel of Fig. 3 with the foundation tube seated thereon and a spring applied to the exterior of such tube; Fig. 5 is an axial section through a pneumatic mandrel which may be employed in another manner of performing this invention; Figs. 6, 7 and 8 illustrate different steps in the manufacture of such tube utilizing the pneumatic mandrel of Fig. 5; Figs. 9 and 10 are views illustrating steps in the manufacture of a modified foundation unit utilizing the mandrel of Fig. 1; Figs. 11, 12 and 13 illustrate steps in the manufacture of a further modified form of the foundation unit for the tube, likewise using the mandrel of Fig. 1; Figs. 14 and 15 illustrate steps in the manufacture of an outside sheath to be placed on the foundation tube over the stretched spring; Fig. 16 illustrates the outside sheath in the pneumatic former ready to be positioned on the foundation unit; Figs. 17 and 18 illustrate the positioning of the foundation unit of Fig. 4 in the sheath; Fig. 19 is a view similar to Fig. 18 but employing a different foundation; Fig. 20 illustrates steps employed for corrugating the tube; Fig. 21 is a view of a fragmental portion of the tube, illustrating its flexibility.

In its general aspects, my tube includes a helical spring stretched from its normal condition of rest but to an extent less than its elastic limit, and anchored at its ends to a flexible impervious covering tube of material similar to rubber. There is a suitable protection on the inner side of the spring which may be a complete foundation tube, or other protecting means. This protection firmly adheres directly to the sheath on opposite sides of the spring coils or to an intermediate member adhering to the sheath. The composite tube thus produced is corrugated inwardly in a helical course between the coils of the spring. The outer surface of the completed tube is smooth and impervious so that there is no danger of anything adhering to it.

My invention, both in its aspects of a new tube and a novel method of producing the same, is susceptible of considerable variation. Accordingly, by way of illustration, I show in the drawings and hereinafter describe five different variations of the tube or method. These are to be taken as selected illustrations rather than enumeration of variations, as I do not intend to limit myself further than the prior art may require.

I will refer first to that variant of my method illustrated in Figs. 1 to 4, 14 to 18, 20 and 21.

In this first variant of the method, I utilize first a foundation tube shown at 10 in Fig. 2 having a comparatively thin wall and open ends. I desire to seat this tube on a mandrel which has a greater external diameter than the internal diameter of the tube. To stretch the tube and mount it on the mandrel, I employ the piece of apparatus indicated at A, in Fig. 1. This apparatus comprises a rigid open-ended tube of metal or similar material having a length shorter than the elastic tube 10 and having an internal diameter greater than the external diameter of the elastic tube. The forming tube or sleeve A is equipped with an external nipple $a$ having a bore communicating with the interior of the sleeve through the wall thereof. A suitable suction connection may be attached to this nipple $a$.

I place the elastic tube 10 within the forming sleeve A with the ends of the tube projecting beyond the sleeve, and I bend the ends of the tube 10 outwardly and backwardly over the ends of the sleeve, as indicated at 11 in Fig. 3. I call this operation "cuffing" the ends of the tube.

I now apply suction to the nipple a (which may be by a suitable hose attached to the nipple) and exhaust the air between the rubber tube and the sleeve, thereby stretching the rubber tube and causing it to seat snugly on the inner wall of the sleeve A as shown in Fig. 3.

The next step is to place within the lined sleeve a rigid mandrel B (Fig. 3) having an external diameter less than the internal diameter of the lined sleeve but greater than the internal diameter of the tube 10 in its original condition as shown in Fig. 2. The exterior of this mandrel may be treated with soapstone or similar material to prevent the rubber tube adhering to it at a later stage in the operation.

I now release the vacuum through the passageway in the nipple a and I free the cuffs 11 from the exterior of the sleeve A, and instantly the tube 10 by its own elasticity contracts and snaps down onto the mandrel B, snugly embracing it by reason of the still stretched condition of the tube 10.

The tube 10 is the foundation tube or inner tube of my composite reinforced corrugated tube about to be explained. Over this foundation tube, while it is on the mandrel B, I place a helical spring 20, preferably of metallic spring wire, and I stretch it to space its coils, as shown in Fig. 4. This stretching, which I term "partially stretched," is for an amount less than the elastic limit of the spring, so that the helix tends to contract but may be further expanded in the manipulation of the complete tube.

The stretching of the spring brings the coils into snug engagement with the exterior of the foundation tube 10, and in this condition the ends of the spring are anchored to the foundation tube. In effecting this anchoring, I prefer to make a plurality of turns of the spring in a direction normal to the axis of the tube and I cover those coils with binding rubberized tape 12, Fig. 4. The stretched and anchored spring is to be covered by an outer impervious tube secured to the exterior of the foundation tube, as about to be described.

In making the outer tube, I prefer to proceed in the manner illustrated in Figs. 14 and 15. I take a rigid mandrel C and I mount on the exterior thereof a thin-wall impervious tube 15 of material similar to rubber. I may effect this mounting in the same manner as described for the tube 10 on the mandrel B. When mounted, I wrap the tube with a cloth covering D, wrapped about it spirally with the edges of the spiral course substantially contacting but flush, as shown in Fig. 14, and in this condition I give a slight vulcanization to the wrapped tube 15. I then strip the tube 15 from the mandrel, turning it inside out as I strip it, as indicated in Fig. 15. The resulting introverted tube has a perfectly smooth exterior, by reason of its having been vulcanized against the smooth metallic mandrel C.

I now mount the introverted tube 15 within a forming sleeve A' (Fig. 16) similar to the sleeve A but preferably of somewhat larger diameter, and I cuff the ends of the tube 15 over onto the outside of the former, as shown at 16. I then apply vacuum to the space between the tube and sleeve wall through a communicating nipple a', thus firmly seating the tube against the interior of the forming sleeve, as shown in Fig. 17.

I now cover with rubber cement the exterior of the seated tube and the spring 20 of Fig. 4, while on the mandrel B, and insert such covered mandrel into the space within the lined sleeve of Fig. 17. I then release the vacuum to the nipple a' and turn back the cuffs 16, and instantly the outer tube snaps down onto the spring-embraced inner tube, by reason of the elasticity of the tube 15, which in its normal condition before being mounted in the sleeve A' was of less internal diameter than the external diameter of the tube 10 on the mandrel B. In fact, I find it convenient to make the original tube 15 before the stretching an exact duplicate of the tube 10, as such tube will readily stretch to a large enough diameter to be conveniently spaced over the seated tube 10 and its spring.

I now wrap the composite tube on the mandrel B with a spiral strip of cloth (similar to the strip D in Fig. 14) and in this condition I give the tube just sufficient vulcanization to set the cement. The smooth exterior surface of the previously partially vulcanized tube 15 is not marred by this external fabric. When the vulcanization has been completed and the fabric removed, I have a composite tube with impervious inner and outer walls and an embraced helical spring, the exterior of the tube being perfectly smooth.

I now strip the composite tube from the mandrel B and place it on a materially smaller mandrel indicated at E in Fig. 20, and I wrap the exterior of the composite tube with a cord F passing in a helical course between the coils of the spring. This cord F forces inwardly the walls between the coils of the spring, so that the inner wall engages the mandrel E and the tube takes a corrugated form, as shown in Fig. 20.

I now vulcanize the corrugated tube, remove the cord F and withdraw the tube from the mandrel E. The tube is now in the condition illustrated at 17 in Fig. 21, where it may be flexed in any direction or compressed or expanded. Suitable rubber bushings (not shown) may be mounted in the end portions of the corrugated tube to obtain a good connection with the apparatus with which the tube is to be used, as will be readily understood.

In place of mounting the inner tube 10 on the solid mandrel B by the use of the hollow external former A, as above described, I may employ the pneumatic mandrel illustrated in Figs. 5, 6, and 7. As there shown, G indicates a tubular member which may be mounted in a lathe chuck H for rotation and supported at its far end by a suitable tail stock, not shown. The bore g of this tube is plugged at its ends and provided with a nipple g' through which compressed air may be admitted to the interior. Suitable passageways g-2 lead from the bore to the outer surface of the member G. Surrounding this member G, covering the openings g-2, is a rubber sheath J tightly secured at its ends J' to the body G. The device last described constitutes a pneumatic mandrel, the sheath J being adapted to be expanded by the admission of compressed air through the nipple g'.

In using the apparatus just described, I draw over the unexpanded mandrel J a rubber tube 13 (Fig. 6) similar to the tube 10 already described. I place over the exterior of this tube 13 a coiled spring 20 like the spring 20 already described. I stretch this spring and bind its ends down onto the tube 13 over the mandrel, as indicated at 14, Fig. 7. I now admit compressed air through the nipple g', which expands the mandrel J, forcing outwardly or stretching the tube 13 so that its outer surface snugly engages the coils of the spring, as shown in Fig. 7. This gives me a foundation tube with a coiled spring snugly embracing it and attached to it corresponding to the tube 10 and coiled spring 20 of Fig. 4, and I may then proceed to cover such tube and spring with an outer tube and to corrugate the composite tube exactly as described with reference to Figs. 14 to 18, 20 and 21, in completing the first variant of my method.

A third variation of the method, whether the foundation tube is placed on the solid mandrel of Fig. 4 or the pneumatic mandrel of Fig. 7, is cover the coils of the spring with a spiral winding of adhesive tape as shown in Fig. 8. In this instance, while the parts are in the condition shown in Fig. 7, I apply suitable cement over the coils of the wire and the adjacent portions of the foundation 13, and then I wind tape 18 over the successive coils of the spring and force its edges down snugly against the outer surface of the tube 13. After this is done I cover with cement the exterior of the tape 18 and see that there is cement on the intermediate exposed regions of the tube 13. From then on I proceed as described with reference to the first variant of my method; that is to say, the tube 13, mounted on the pneumatic mandrel J on the member G and covered with the spring and tape, is placed inside of the rubber lined forming sleeve A' of Fig. 16 and the vacuum released to bring the exterior tube 15, which was carried on the interior of the forming sleeve A', down onto the member of Fig. 8 producing the construction shown in Fig. 19. Thereafter, the release of the compressed air from the interior of the pneumatic mandrel J releases the composite tube which is removed and placed on the smaller mandrel E and the corrugating and final vulcanization steps are performed as already described.

Figs. 9 and 10 indicate a fourth variant of my method. In this case, I employ no inner tube but mount directly on the pneumatic mandrel J (preferably covered with soapstone) a tape of rubber or rubberized material 19 wound in spiral course and following the same helix which the spring is to have. Then I place the spring 20 outside of the taped mandrel, with the spring coils in registration with the medial line of the tape coils, and I anchor its end portions to turns of tape 19a normal to the axis. I then expand the mandrel to firmly seat the tape against the wire, as shown in Fig. 10.

After applying suitable cement to the exterior of the tape 19 and helical wire, I proceed as formerly, the covered hollow mandrel being inserted in the rubber-lined forming member A' and the vacuum released to cause the outer tube 15 to snap down onto the wire coils above the tape. Thereafter the hollow mandrel is shrunk, the internally reinforced tube 15 withdrawn and placed on the mandrel E, bound down by the cord F to corrugate it and the structure vulcanized. This variant of my method produces a tube cheaper than that of the variants 1, 2 and 3, but still useful for many purposes.

A fifth variant of my method is illustrated in Figs. 11, 12 and 13. As there indicated, I employ the pneumatic mandrel of Fig. 1 but instead of placing a foundation tube about it I wind a strip of rubberized fabric 30 in a helical course directly on a suitable soaped mandrel with the edges of the strip abutting, as shown in Fig. 11. I then place a helical spring over the exterior of the foundation member consisting of the spiral tubular member of fabric 30, and stretch the spring 20 and anchor the ends so that it takes the form indicated in Fig. 12. I now cover the exterior of the spring with cement and wind another strip of fabric 31 in a helical course over the foundation spring, this winding inclining in the opposite direction from Fig. 12, so that the edges of the final winding snugly abut each other as shown in Fig. 13.

The above described operation produces a very efficient carcass comprising an inner foundation tube 30 made in a spiral manner surmounted by a spring and covered with a second spirally wound tube 31, the strips of the outer winding crossing the junctions of the inner winding, and vice versa. I then proceed to cover the reinforced carcass with the introverted tube 15, which may be of very thin rubber, and complete the corrugating operation in the same manner as in the other variants.

It will be seen that in each of the five variants of my method explained, I employ a stretched helical spring and surround it by an outer sheath, and protect the spring on the interior so that it is entirely covered and cemented or vulcanized in place, and the whole structure corrugated and finally vulcanized in corrugated form.

Furthermore, in each of the variants I employ an impervious elastic tube, preferably introverted, for forming the external sheath, and I put the sheath firmly in place by first stretching it by external suction and then passing it over the spring and releasing the suction, causing it to snap into place and snugly adhere by reason of its own elasticity.

I claim:

1. The method of making a corrugated tube comprising winding a tape spirally on a suitable support, placing a helical spring in position over the tape stretched so that each coil of the spring registers with the coils of the tape, covering the tape and spring by an impervious rubber tubular sheath, corrugating the product between the coils of the spring, and vulcanizing it in the corrugated condition.

2. The method of making a flexible tube comprising winding a strip of fabric in a spiral direction on a suitable mandrel, partially stretching a helical spring about the spirally wound foundation, winding a second strip of fabric at an angle to the first strip about the exterior of the spring, covering the fabric included spring so made with an impervious elastic tube having a smooth exterior surface, corrugating the article thus produced by inward pressure between the turns of the spring, and vulcanizing the product.

3. The method of making a flexible tube comprising placing a foundation tube within a hollow sleeve, securing the ends of the tube to the sleeve, exhausting the air between the sleeve and tube to stretch the tube, placing a mandrel within the stretched tube, releasing the suction and the ends of the tube to allow the tube to seat on the mandrel, removing the sleeve, placing on the outside of the seated tube a partially stretched helical spring, placing another tube in a hollow sleeve, and securing its ends to that sleeve, exhausting the air between that sleeve and the latter tube to stretch such tube until the internal diameter thereof is greater than the external diameter of the tube on the mandrel, placing the mandrel with its tube and spring within the lined lastmentioned sleeve, releasing the air between the latter sleeve and the tube carried thereby and freeing the ends of such tube to allow it to contract and seat on the foundation tube.

4. The method of making a flexible corrugated tube comprising forming a carcass consisting of a foundation member and a surrounding partially stretched helical spring, placing a rubberlike tube for a sheath on a mandrel, wrapping the same with fabric and partially vulcanizing it, turning the tube inside out, stretching it radially, placing it about the exterior of the carcass, and releasing the stretching force to allow the introverted stretched tube to snap inwardly into engagement with the spring and foundation member, corrugating the article so produced and vulcanizing it while corrugated.

ROBERT ELDON ROBERTS.

REFERENCES CITED

The following references are of record in the file of this patent:

UNITED STATES PATENTS

| Number | Name | Date |
|---|---|---|
| 165,324 | Greacen | July 6, 1875 |
| 713,560 | Dodge | Nov. 11, 1902 |
| 1,576,767 | Loomis et al. | Mar. 16, 1926 |
| 1,746,701 | Kimmich | Feb. 11, 1930 |
| 1,809,260 | Wilson et al. | June 9, 1931 |
| 1,819,175 | James | Aug. 18, 1931 |
| 1,937,069 | Rado | Nov. 28, 1933 |
| 1,974,285 | Maclachlan | Sept. 18, 1934 |
| 2,013,684 | Capella-Dalmau | Sept. 10, 1935 |
| 2,090,794 | Harrah | Aug. 24, 1937 |
| 2,140,638 | Maclachlan | Dec. 20, 1938 |
| 2,156,899 | Pierce | May 2, 1939 |
| 2,176,762 | Forbes | Oct. 17, 1939 |
| 2,272,704 | Harding | Feb. 10, 1942 |
| 2,321,064 | Broedling | June 8, 1943 |
| 2,396,059 | Roberts | Mar. 5, 1946 |
| 2,430,081 | Roberts et al. | Nov. 8, 1947 |
| 2,508,774 | Roberts | May 23, 1950 |

FOREIGN PATENTS

| Number | Country | Date |
|---|---|---|
| 10,796 | Great Britain | 1896 |
| 393,469 | Great Britain | June 8, 1933 |